(12) United States Patent
Kalb et al.

(10) Patent No.: US 6,427,386 B1
(45) Date of Patent: Aug. 6, 2002

(54) ENGINE-GEARBOX UNIT FOR ADJUSTMENT DEVICES IN MOTOR VEHICLES

(75) Inventors: Roland Kalb, Rossach; Henry Perschke, Sonnefeld; Bernd Münekhoff, Ebersdorf; Manfred Sünkel, Coburg; Thomas Fröhlich, Bamberg, all of (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/380,198

(22) PCT Filed: Feb. 24, 1998

(86) PCT No.: PCT/DE98/00577

§ 371 (c)(1),
(2), (4) Date: Dec. 30, 1999

(87) PCT Pub. No.: WO98/38057

PCT Pub. Date: Sep. 3, 1998

(30) Foreign Application Priority Data

Feb. 27, 1997 (DE) .......................... 197 07 850

(51) Int. Cl.⁷ .................................. E05F 15/16
(52) U.S. Cl. ..................... 49/349; 296/146.1
(58) Field of Search .................. 49/349, 350, 351, 49/352, 502; 296/146.1, 146.2

(56) References Cited

U.S. PATENT DOCUMENTS

| 3,469,128 | A | * | 9/1969 | Cartier | 49/349 |
| 4,314,692 | A | * | 2/1982 | Brauer et al. | 49/349 |
| 4,338,747 | A | * | 7/1982 | Hess et al. | 49/349 |
| 4,471,251 | A | * | 9/1984 | Yamashita | 296/146.1 |
| 4,848,829 | A | | 7/1989 | Kidd | 296/152 |
| 5,548,930 | A | | 8/1996 | Morando | 49/502 |
| 5,581,952 | A | * | 12/1996 | Kapes et al. | 49/352 |
| 5,588,260 | A | * | 12/1996 | Suzuki et al. | 49/502 |
| 5,875,588 | A | * | 3/1999 | Torii et al. | 49/349 |
| 5,890,321 | A | * | 4/1999 | Staser et al. | 49/502 |
| 6,073,395 | A | * | 6/2000 | Fenelon | 49/358 |
| 6,114,820 | A | * | 9/2000 | Nishigaya | 318/466 |

FOREIGN PATENT DOCUMENTS

| DE | 195 13 085 | 4/1996 |
| DE | 195 09 282 | 11/1996 |
| EP | A 579 535 | 1/1994 |
| WO | WO 94 03341 | 2/1994 |

* cited by examiner

*Primary Examiner*—Curtis Cohen
(74) *Attorney, Agent, or Firm*—Christie, Parker & Hale, LLP

(57) ABSTRACT

Motor/gear unit for adjustment devices in motor vehicles with a base plate 2 supporting the motor/gear unit and able to fit in an opening 10 of a wall 1 separating a wet space A from a dry space B. The output 5 of gear is mounted on the wet space side A and at least the elements for the electrical contact of the electric motor 6 and where applicable a switch and/or an electronic control device 7 are mounted on the dry space side B. A seal 3 enclosing the opening 10 is mounted between the wall 1 and the base plate 2. The base plate 2 forms one unit at least with a part of the gear housing 20 and is mounted on the wall 1 from the wet space side A.

19 Claims, 6 Drawing Sheets

ENGINE-GEARBOX UNIT FOR ADJUSTMENT DEVICES IN MOTOR VEHICLES

BACKGROUND OF THE INVENTION

The invention relates to a motor gear unit for adjustment devices in motor vehicles and is particularly suitable for use in a vehicle door having a wall for separating a wet space and dry space.

A base plate is known from EP A 579 535 on which is mounted from the dry space side a handle, an inner door lining as well as a switch for a window lifter unit which is fixed on the wet space side. The window lifter unit is mounted together with the motor-gear unit on the wet space side of the base plate which is screwed from the dry space side in front of the opening onto the inner door panel of the door body so that the vehicle door is divided into a wet space on the outside and a dry space on the inside.

A further device for use for the door of a motor vehicle is known from DE 195 09 282 A1. It has a support plate on which is mounted a number of functional units such as window lifter with drive and control unit, lock, speaker and cable tree. An extensively equipped precheckable module is thereby produced which allows efficient production of vehicle doors in high quality. The support plate has in its marginal area a circumferential seal and closes a comparatively large cut-out section in the inner door plate in a watertight manner so that the vehicle door is divided into an outer wet space and inner dry space.

In order to be able to manufacture the electrical components in the cost-effective dry space design, the electrical components are mounted on the dry space side of the support plate. This also applies for a drive and control module which consists of an electric motor, gearbox, electronic control unit and switch block. The output shaft of the drive unit thereby engages through a small opening in the support plate which is sealed by a seal between the gearbox housing and the support plate on the dry space side. The pushed-through end of the output shaft produces a connection with the mechanism of a window lifter e.g., through the engagement in a cable drum of a Bowden tube window lifter.

SUMMARY OF THE INVENTION

The object of the invention is to develop a motor/gear unit for adjustment devices in motor vehicles which is suitable as a complete precheckable and prefabricated unit for installation on a wall which separates a wet space from a dry space wherein the electrical and, where applicable, electronic components are to be used in a dry space design; likewise, a simple maintenance and repair of the motor gear unit is made possible.

According to the present invention, this is achieved through a base plate which is mounted from the wet space side on the wall wherein at least the elements for the electrical contact with the electric motor are accessible from the dry space side by means of the opening of the wall in the assembled state.

According to a first variation, the base plate is mounted with the motor/gear unit from the wet space side on the wall between the wet and dry space wherein the opening in the wall is closed watertight.

According to a second variation, the opening extends into the edge of the wall so-that a cut-out section is formed with a substantially U-shaped contour. The edge of this cut-out section can be brought into engagement with a guide groove which is worked into the narrow circumferential end face of the base plate. To this end the guide groove of the base plate is supplied to the edge of the substantially U-shaped cut-out section and the base plate is moved parallel to the wall until the opening is closed.

When using the first variation where an opening (with closed edge) in a wall, e.g., in an inner door panel or in a support plate, is closed by a base plate from the wet space side, the opening must be at least large enough so that the elements for electrical contact such as, e.g., plug connections are accessible from the dry space side. It is obvious that the housing walls of the motor/gear unit which form a boundary face between the wet space and dry space likewise have to be watertight. If a shift of the motor/gear unit towards the dry space is to be desired then this unit can be pushed through if the opening is sufficiently large. As a rule, the requirements are for a substantially flat and thus simple design of the base plate which in turn allows a simple secure seal.

The formation of the sealing area between the base plate and the wall between the wet and dry space can take place through separate sealing elements which are either prefitted on the base plate or the wall or the seal is integrated into the base plate in a plastics injection molding tool in a two-phase process. This process is known by the term 2-K technology.

However, it is also possible to use as sealing material, a sufficiently elastic sealing foil which substantially covers the wall and forms the actual damp barrier. Preferably, the sealing foil is mounted on the dry space side of the wall and turned over through the opening onto the wet space side where a fitting seat with the base plate is provided so that the seal is produced on the wet space side.

Screws, rivets or clips can serve as fixing elements between the base plate and the wall. It should however be pointed out that the fixing points lie inside the contour of the seal in order to avoid additional measures for sealing the through openings of the fixing element.

DESCRIPTION OF THE DRAWINGS

The invention will now be explained in further detail with reference to the embodiments shown in the drawings in which.

DETAILED DESCRIPTION OF THE INVENTION

Figure 1:
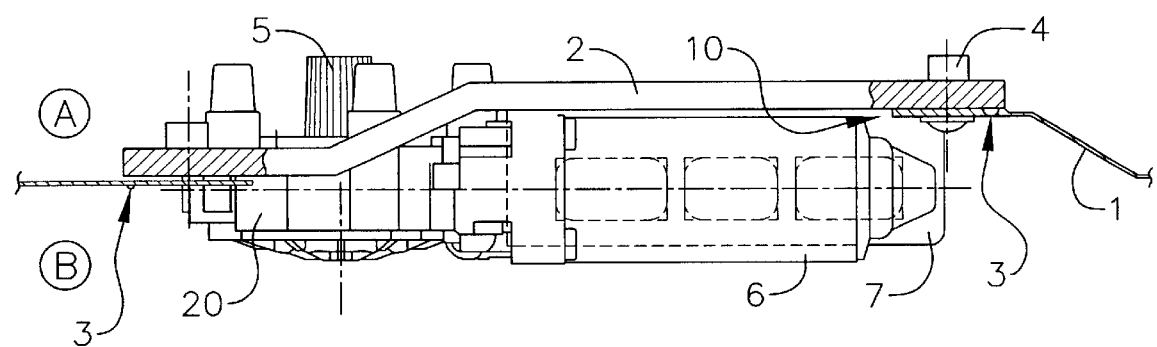
FIG. 1 is a side view of a base plate with motor/gear unit in an opening of a wall for separating a wet space from a dry space.
Figure 2:
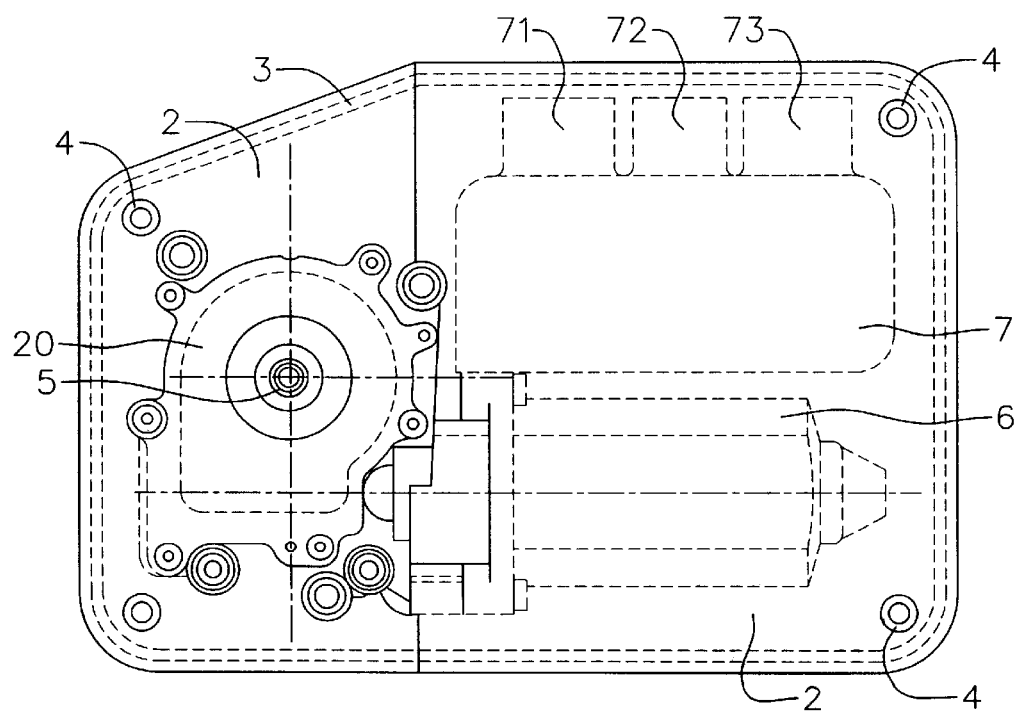
FIG. 2 is a view from the wet space side of the motor/gear unit according to FIG. 1.

The embodiment according to FIGS. 1 and 2 uses a substantially flat base plate 2 slightly angled to fit the off-set fixing areas at the edge of the opening 10 of the wall 1 and forming at the same time a homogeneous component part of the gear housing 20 for the gearwheel element. Since it is intended to make the base plate 2 by means of the so-called 2-K technology, the circumferential seal 3 can be integrated with the base plate 2 using a suitable softer material.

The base plate 2 was made large enough so that its outer contour encloses with its circumferential seal 3, all the components (motor 6, gear housing 20, electronic control unit 7 with plugs 71, 72, 73). Since the opening 10 in the wall was not sized substantially smaller, the designated components can be easily threaded into the dry space from the wet space side. Fixing elements 4 are provided to connect the base plate 2 with the support plate 1 but these themselves should be watertight since they pass through the base plate 2. Otherwise, there is the danger that a permeable connection could arise between the wet space A and dry space B.

The single function element, which passes through the base plate 2 to the wet space side A, is the shaft of the output drive 5 which is obviously sealed from the base plate 2. When using a motor/gear unit for an electrically driven window lifter of a motor vehicle door the output drive can be connected, for example, to the cable drum of a cable window lifter or to the pinion or a window lifter arm.

Figure 3:
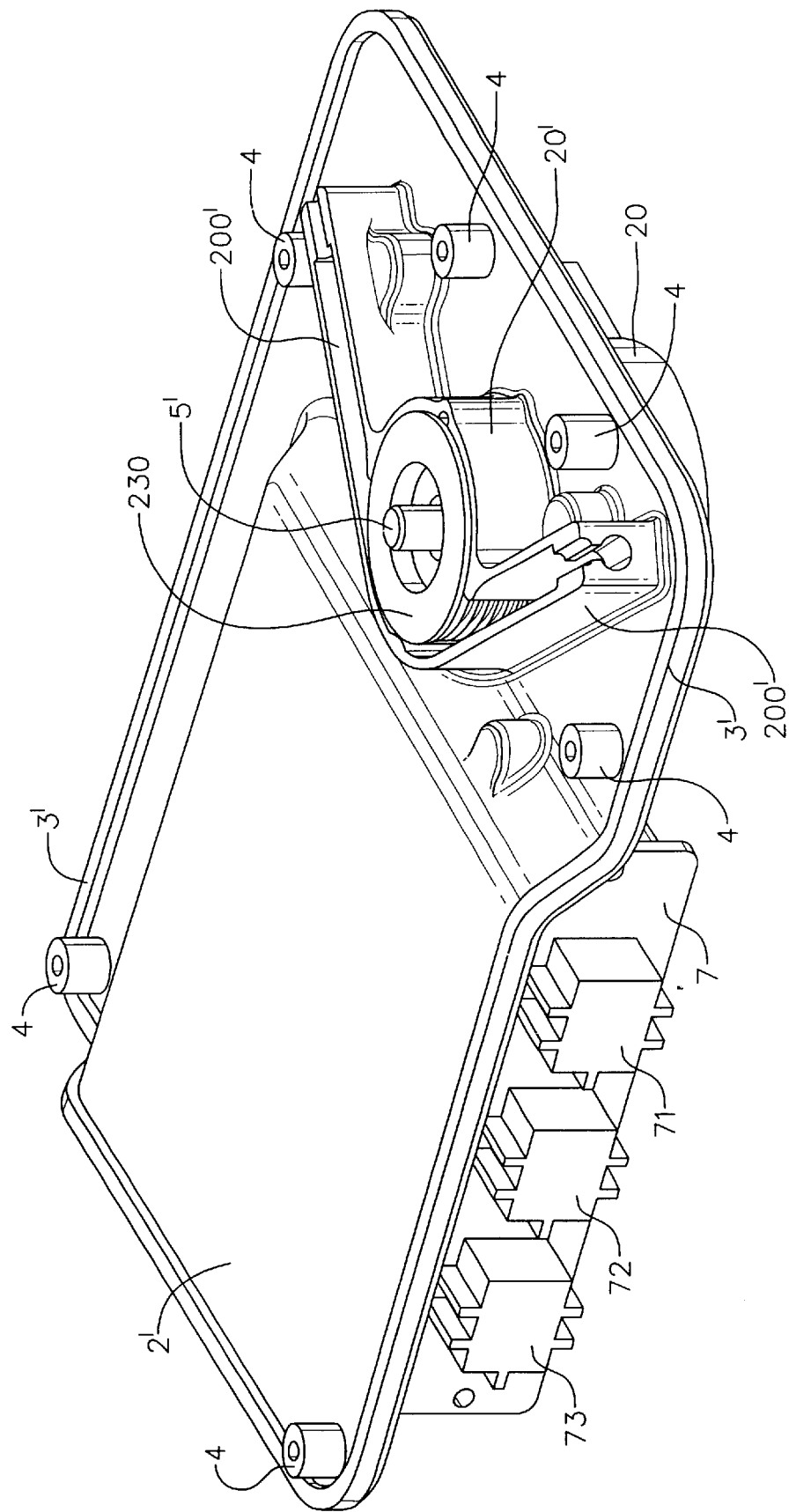
FIG. 3 is a perspective illustration of the wet space side of a base plate with motor/gear unit and a gear housing in the form of a cable drum housing molded in one piece on the base plate.
Figure 4:
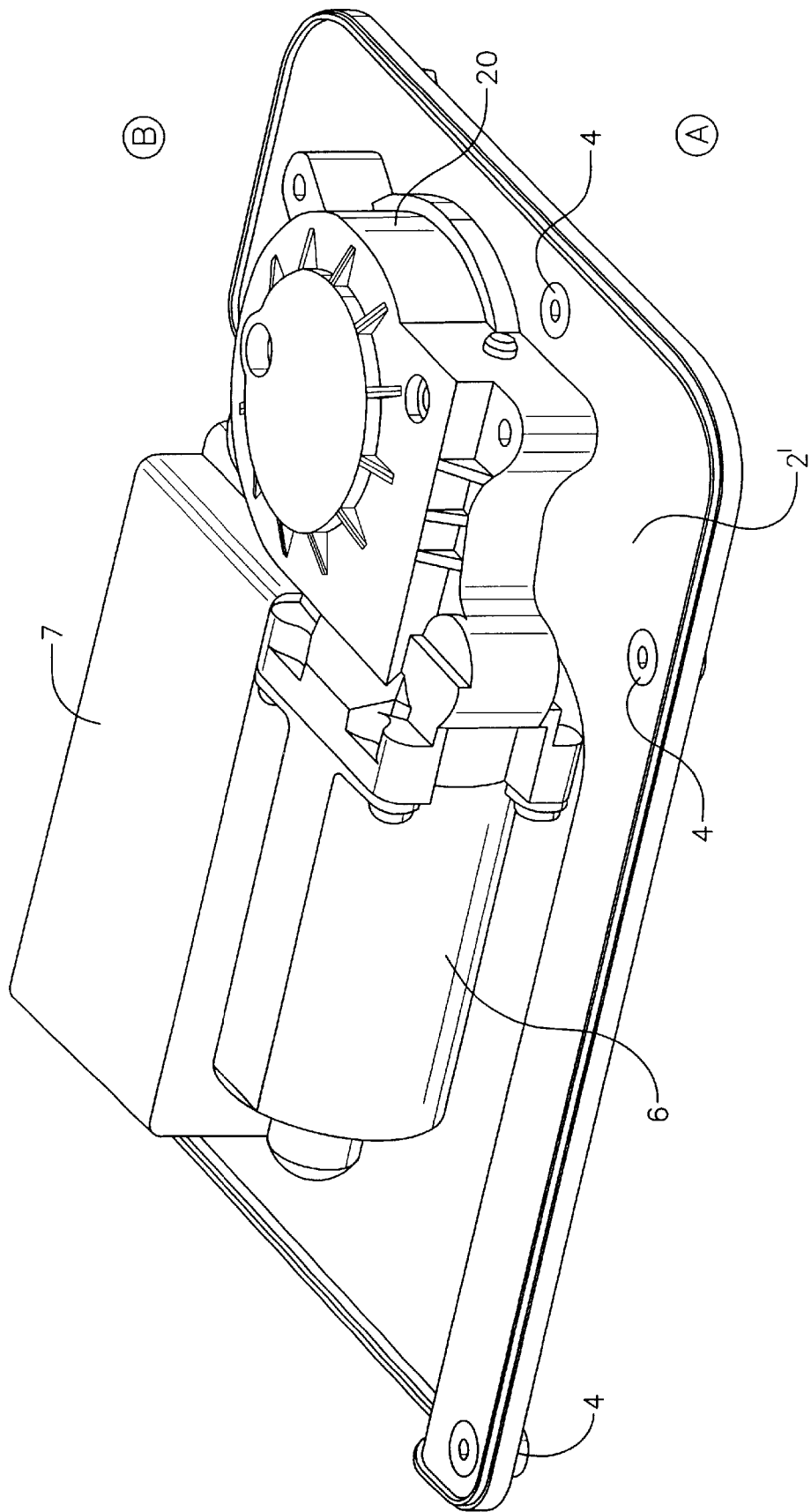
FIG. 4 is a perspective illustration of the dry space side of the base plate with motor/gear unit according to FIG. 3.

The embodiment of FIGS. 3 and 4 differs from the embodiment described above basically in that it is not the gear housing 20 of the gearwheel elements but the gear housing for the cable drum 230, including its cable outlets 200', which form a one-piece component part with the base plate 2'. The service conditions are hereby considerably improved. In the event of damage to the electronics unit 7, motor 6 or the gear wheel drive enclosed by the gear housing 20, an exchange is readily possible without having to dismantle the base plate 2'. This means that it is not necessary to involve the adjustment mechanism of the window lifter so that the service expense is considerably reduced.

Figure 5:
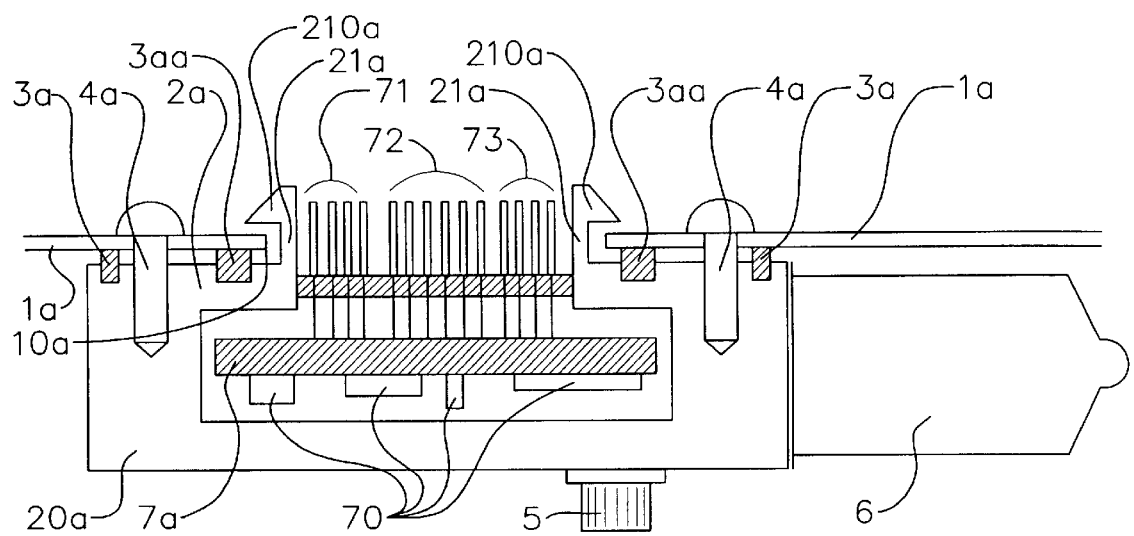
FIG. 5 is a diagrammatic sectional illustration of a motor/gear unit with elements for aiding assembly and a housing for the electronics control unit integrated in the base plate.

The diagrammatic sectional view, according to FIG. 5, shows a motor/gear unit whose housing 20a comprises both parts of the gear and electronic control unit. The base plate 2a, as well as an assembly aid consisting of the passage 21a with hooks 210a, are integrated in the housing 20a. By means of the assembly aid, it is possible to obtain a simple rough fixing of the motor/gear unit on the support plate 1a before the fixing screws 4a are fitted. The fixing screws 4a are screwed from the dry space side B through the support plate 1a into blind holes of the housing 20a between two circumferential seals 3a, 3aa. Although the use of the outer seal 3a is as a rule sufficient for ensuring tightness, under extreme load conditions a second seal can only guarantee the desired amount of security.

Electrical plugs 71, 72, 73 are mounted in the passage 21a and are connected to a conductor plate 7a and electronic components 70. The plugs 71, 72, 73 are accessible from the dry space side B and serve to supply power to the motor and to the electronic control unit or signal lead. All other components of the motor gear unit are in a watertight capsule and are located structurally on the wet space side A.

Figure 6:
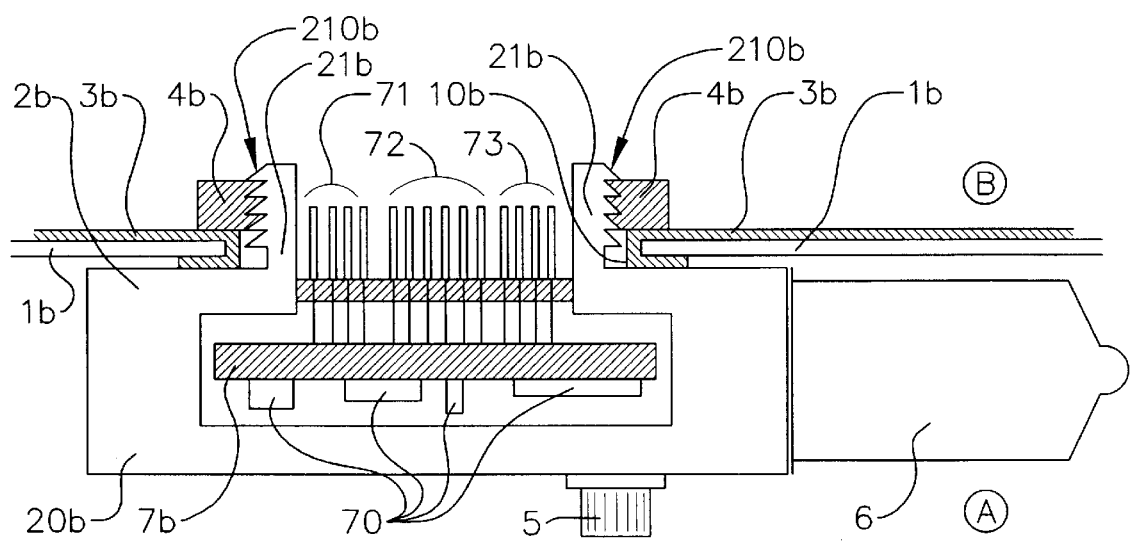
FIG. 6 is a diagrammatic sectional illustration of a motor/gear unit with clip-on fixing elements and a seal formed as a sealing foil.

The construction of the motor gear unit, according to FIG. 6, is substantially the same as that of FIG. 5. However there are differences regarding the seal and fixing. Thus the embodiment of FIG. 6 uses a foil-type seal 3b which is placed on the dry space side B of the support plate 1b and turned through the opening 10b to the wet space side A. Fixing the motor/gear unit is by a clip-fitting fixing element 4b which can engage positively in the detent teeth 210b of the passage 21b. The fixing is to be tensioned so strongly that a press fit sufficient for sealing is provided between the turned-over area of the sealing foil 3b and the housing 20b or base plate 2b.

Figure 7:
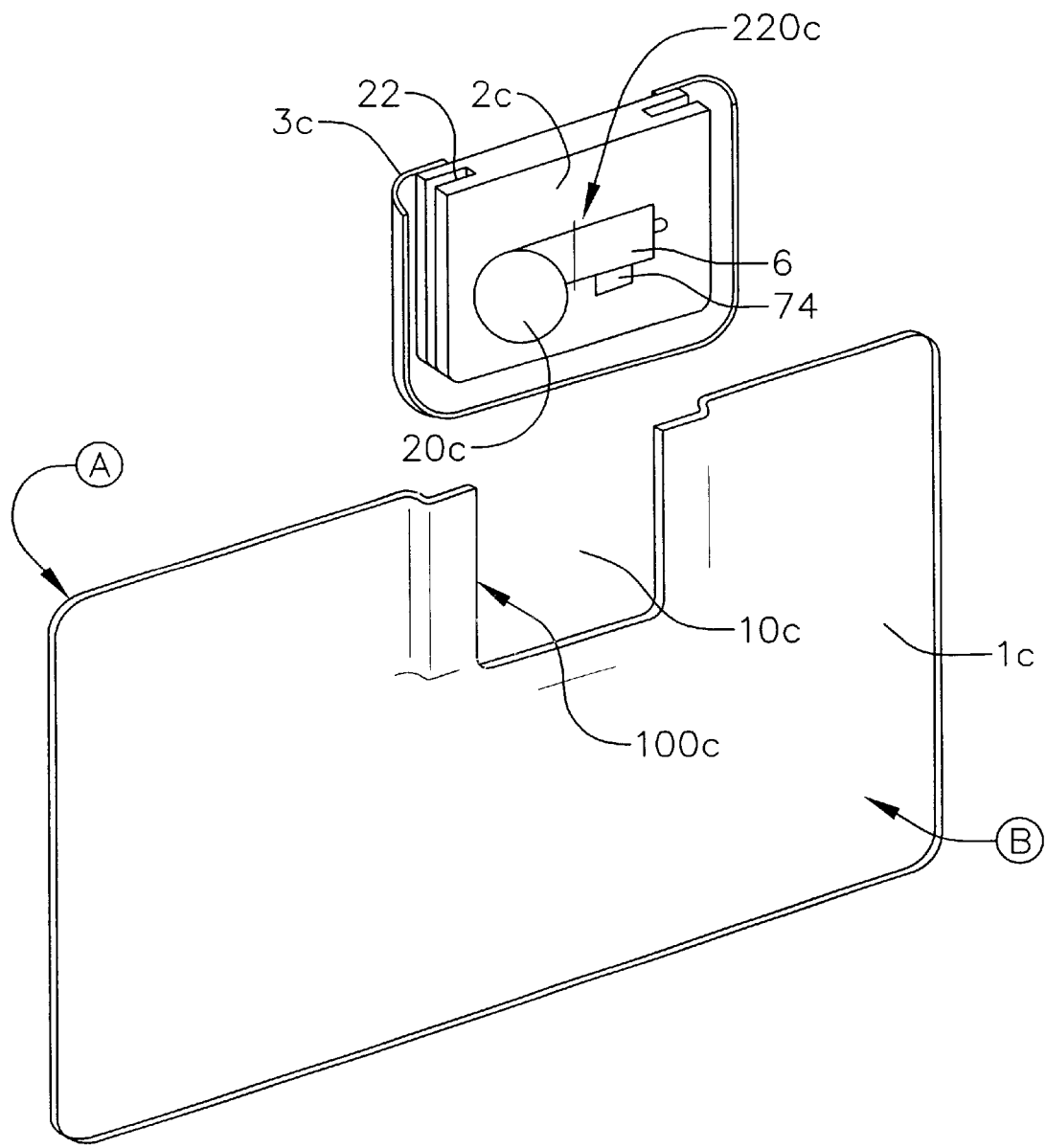
FIG. 7 is a diagrammatic illustration of a support plate with open cut-out section associated with a base plate with suitably aligned fixing groove.

A variation of the invention is shown diagrammatically in FIG. 7. Starting from an upwardly open cut-out section 10c in the support plate 1c the base plate 2c is not mounted from the wet space side—as described above—but is mounted from above. The base plate 2c is thereby pushed with its circumferential groove 22, on the narrow end side, into the opening 10c wherein the edge 100c enters into positive engagement with the groove 22. It is thereby possible to dispense with locking of the base plate 2c on the support plate 1c through separate fixing means, e.g., if a sufficient position stability is reached after fitting the inner door lining.

The diagrammatically illustrated drive and control unit 220c, consisting of the gear 20c, motor 6 and the electrical plug 74, is mounted on the dry space side B wherein at least a part of the gear housing 20c is integrated in the base plate 2c. A circumferential seal 3c on the outer contour of the base plate 2c and on the wet space side A ensures optimum wet protection.

Obviously the open cut-out section 10c can also have a contour other than U-shaped and where necessary can be mounted on one of the side edges of the support plate 1c.

Figure 8:
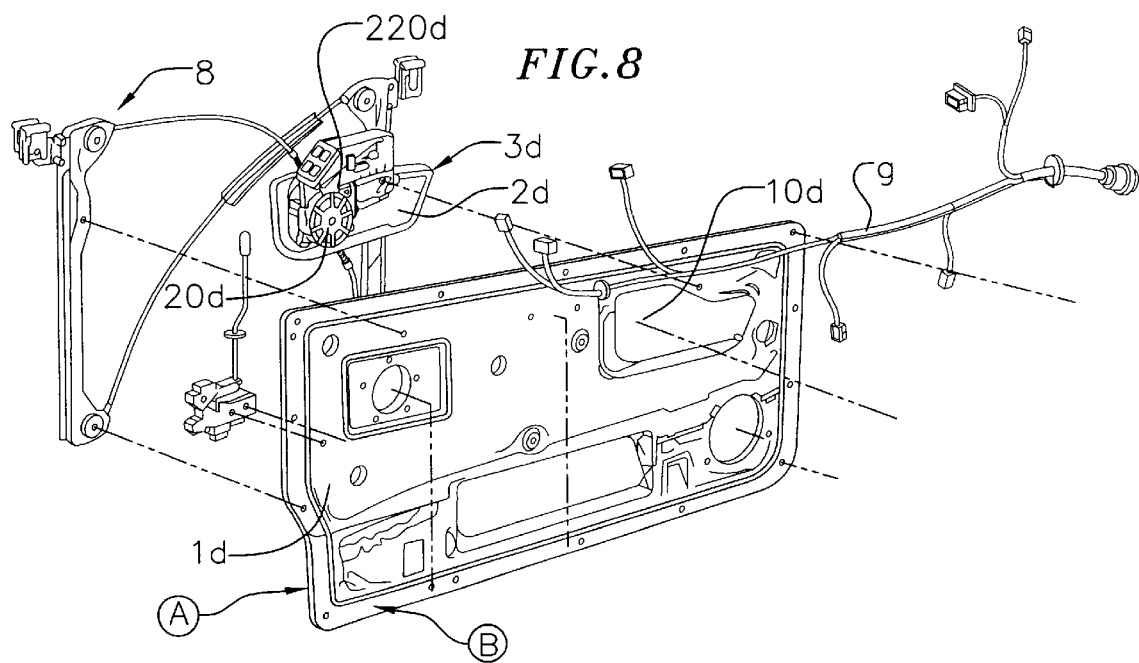
FIG. 8 is a perspective illustration of a double-strand Bowden tube window lifter with pre-fitted motor/gear unit with base plate which is mounted in an opening of a support plate from the wet space side.

FIG. 8 shows in a perspective view the use of the invention for a double-strand Bowden tube window lifter 8 which is to be fitted on a support plate 1d. At this point it should be pointed out that the inner panel of a motor vehicle door can also be used instead of the support plate 1d.

The drive and control unit 220d with the integrated base plate 2d is in prefitted connection with the window lifter mechanism 8 wherein the output engages in a cable drum which is mounted in a cable drum housing 80. Thus a fully functional and precheckable unit is produced. For fitting same on the support plate 1d the drive and control unit 220d is guided through the opening 10d of the support plate 1d. The seal 3d mounted on the base plate 2d encloses the opening 10d completely and seals same. The electrical connections of the cable tree 9 can then be fitted.

Figure 9:
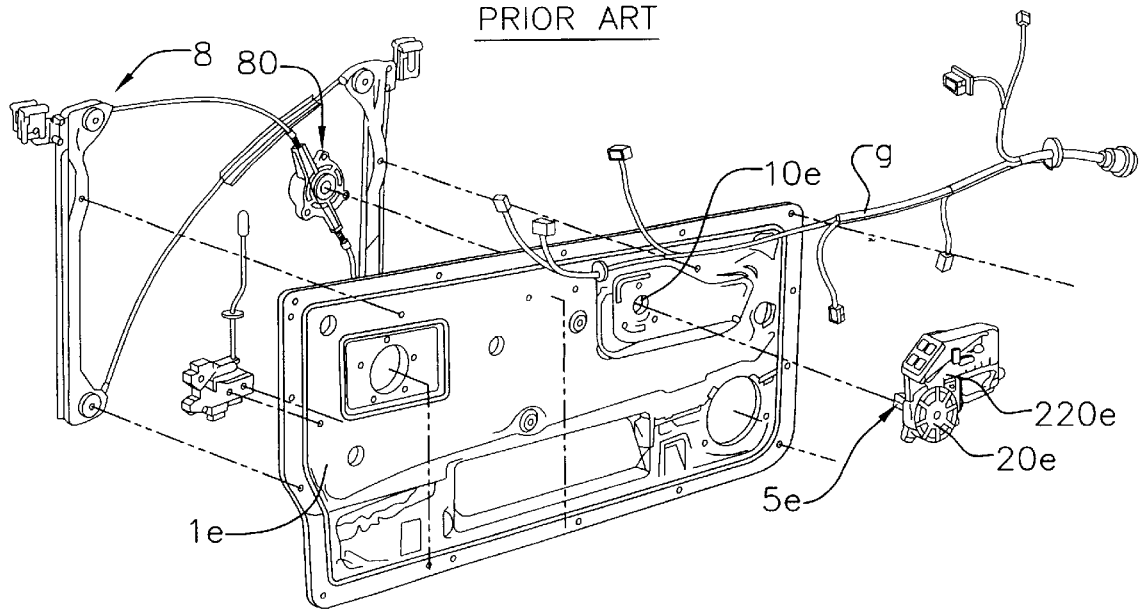
FIG. 9 is a perspective view of the arrangement and method of fitting a double-strand Bowden tube window lifter, an assembly plate and a motor/gear unit.

FIG. 9 shows a solution known from the prior art using a drive and control unit 220e similar to the variation of FIG. 4 and an identical window lifter mechanism 8. However, a modified support plate 1e is used with a small through opening 10e for the output drive 5e while a base plate integrated in the drive and control unit and which can be mounted from the wet space side is missing. This design does not allow the manufacture of a complete precheckable functional unit with the exclusion of the support plate 1e or inner door panel (not shown). When fitting a window lifter on the inner door panel there is increased assembly expense compared with the solution of FIG. 8, characterized by ergonomically unfavorable handling and the risk of faults connected therewith.

What is claimed is:
1. A motor/gear unit assembly for adjustment devices in motor vehicles, the motor/gear unit assembly comprising:
a support plate that separates a wet side from a dry side of a vehicle, the support plate having an opening;

a motor/gear unit having a gear housing, an electric motor, elements for electrical contact with the electric motor and an output;

a base plate having a wet space side and a dry space side, the base plate supporting the motor/gear unit wherein the output of the motor gear unit is on the wet space side of the base plate and the elements for the electrical contact with the electric motor are on the dry space side of the base plate;

wherein the base plate includes a sealing area on the dry space side of the base plate for enclosing the opening of the support plate;

wherein the base plate is unitary with at least a part of the gear housing;

wherein the elements for the electrical contact with the electric motor are located within the sealing area such that they are accessible from the dry space side of the vehicle by said opening when the base plate is assembled to the support plate.

2. The motor/gear unit assembly according to claim 1 wherein the base plate and the gear housing are formed as a one-piece component.

3. The motor/gear unit assembly according to claim 1, wherein the gear housing is configured to receive a cable drum with cable outlets and wherein the base plate and the gear housing are formed as a one-piece component.

4. The motor/gear unit assembly according to claim 1 wherein the electric motor is located within the sealing area and projects from the sealing area of the dry space side of the base plate such that it can be guided through the opening of the support plate when the base plate is assembled to the support plate.

5. A motor/gear unit assembly for adjustment devices in motor vehicles, the motor/gear unit assembly comprising:

a support plate separating a wet side and a dry side of a vehicle, the support plate having an opening;

a motor/gear unit having a gear housing, an electric motor, elements for electrical contact with the electric motor and an output;

a base plate having a wet space side and a dry space side, the base plate supporting the motor/gear unit and mounted on the support plate from the wet side of the vehicle such that the motor/gear unit fits into the opening of the support plate, the output of the motor gear is mounted on the wet space side and the elements for the electrical contact with the electric motor are mounted on the dry space side;

a sealing area mounted between the support plate and the base plate and enclosing the opening;

wherein the base plate is unitary with at least a part of the gear housing and wherein the elements for the electrical contact with the electric motor are accessible from the dry side of the vehicle by said opening in the assembled state.

6. The motor/gear unit assembly according to claim 1 wherein a separate sealing element is fixed on the sealing area of the base plate.

7. The motor/gear unit assembly according to claim 1 wherein a separate sealing element in the form of a sealing foil is fixed on the sealing area of the base plate.

8. The motor/gear unit assembly according to claim 1 wherein the base plate has a sealing element integrated in one piece in the base plate by 2-component technology.

9. The motor/gear unit assembly according to claim 1, comprising a plurality of fixing elements for connecting the base plate to the support plate, and wherein the fixing elements lie inside the sealing area.

10. The motor/gear unit assembly according to claim 1, comprising an electronic control device mounted on the dry space side of the base plate.

11. The motor/gear unit assembly according to claim 1, comprising a switch mounted on the dry space side of the base plate.

12. The motor/gear unit assembly according to claim 1, comprising a switch mounted on the dry space side.

13. A motor/gear unit assembly for adjustment devices in motor vehicles, comprising:

a support plate separating a wet side and a dry side of a vehicle, the support plate having an opening;

a motor/gear unit having a gear housing, an electric motor, elements for electrical contact with the electric motor and an output;

a base plate having a wet space side and a dry space side, the base plate supporting the motor/gear unit such that the motor/gear unit fits in the opening of the support plate;

wherein the output of the motor/gear unit is on the wet space side and the electrical contact elements of the electric motor are on the dry space side;

a sealing area for enclosing the opening;

wherein the base plate is unitary with at least a part of the gear housing;

wherein the opening extends into an edge of the support plate and forms a substantially U-shaped cut-out section and wherein the base plate has a guide groove which engages the edge forming the contour of the U-shaped cut-out section and which can be brought into engagement with an edge of the opening.

14. The motor/gear unit assembly according to claim 13 wherein the U-shaped cut-out section opens upward.

15. The motor/gear unit assembly according to claim 13 wherein the base plate has a circumferential seal which is supported on the support plate from the wet side of the vehicle.

16. The motor/gear unit assembly according to claim 13, comprising an electronic control device mounted on the dry space side of the base plate.

17. A motor vehicle door having a wet side and a dry side, comprising:

a wall having an opening, the wall separating the wet side and dry side of the vehicle;

a motor gear unit;

a base plate having a wet space side and a dry space side, the base plate supporting the motor gear unit such that the motor gear unit fits into the opening of the wall of the motor vehicle when the base plate is mounted to the wall;

an output of the motor gear unit on the wet space side;

an electric motor having at least one electrical contact element, wherein the at least one electrical contact element and the electric motor are on the dry space side;

a sealing area enclosing the opening and between the wall and the base plate;

a gear housing, wherein the base plate is unitary with at least a part of the gear housing;

wherein the base plate is mounted on the wall from the wet side of the vehicle and the opening of the wall is dimensioned so that the at least one electrical contact element with the electric motor is accessible from the dry side of the vehicle through the opening in the assembled state.

18. The motor vehicle door according to claim 17, further comprising an electronic control device that fits through the opening.

19. The motor gear unit according to claim 18 wherein a contour of the sealing area projects over the electronic control device.

* * * * *